United States Patent [19]

Beam

[11] 3,775,948
[45] Dec. 4, 1973

[54] DEVICE FOR CLEANING EXHAUST PRODUCTS

[76] Inventor: Jimmie V. Beam, 1201 58th Ter., Fort Smith, Ark. 72901

[22] Filed: Jan. 18, 1972

[21] Appl. No.: 218,692

[52] U.S. Cl.................. 55/238, 55/257, 55/340, 55/397, 55/398, 55/399, 55/452, 55/456, 209/139 R, 209/144, 209/459, 261/111
[51] Int. Cl............................................. B01d 47/06
[58] Field of Search................. 55/220, 222, 235, 55/237, 238, 240, 241, 257, 258, 269, 315, 338–340, 392, 394, 396–399, 417, 434, 440, 441–449, 452, 455, 456, 457; 261/108–112; 209/3, 138, 139 A, 139 R, 144, 146, 211, 459

[56] References Cited
UNITED STATES PATENTS

| 963,832 | 7/1910 | Tiemann | 55/257 X |
|---|---|---|---|
| 2,402,845 | 6/1946 | Rodman | 55/396 X |
| 2,453,593 | 11/1948 | Putney | 55/398 |
| 2,489,618 | 11/1949 | Cantin | 55/396 X |
| 2,740,491 | 4/1956 | Vecchio | 55/257 X |
| 2,999,593 | 9/1961 | Stern | 209/211 X |
| 3,010,579 | 11/1961 | Duesling | 209/211 |
| 3,105,103 | 9/1963 | Old | 261/111 X |
| 3,473,298 | 10/1969 | Berman | 55/222 |
| 3,077,714 | 2/1963 | McIlvaine | 55/238 |
| 3,550,356 | 12/1970 | Abboud | 55/257 X |
| 1,880,185 | 9/1932 | Kerns et al. | 209/211 |

FOREIGN PATENTS OR APPLICATIONS

| 579,241 | 9/1958 | Italy | 209/459 |
|---|---|---|---|
| 782,138 | 5/1935 | France | 55/392 |
| 848,348 | 1/1951 | Germany | 55/392 |
| 1,063,400 | 5/1954 | France | 55/396 |
| 706,167 | 5/1941 | Germany | 55/248 |

*Primary Examiner*—Frank W. Lutter
*Assistant Examiner*—Vincent Gifford
*Attorney*—Harvey B. Jacobson

[57] ABSTRACT

Apparatus for thoroughly cleaning the exhaust products of industrial processes includes a baffled, multi-level spray chamber, a heat exchanger and a spirally baffled, multi-compartmented separator. A gaseous exhaust medium, containing entrapped particles as well as condensible vapors, is wetted as it flows downwardly through the spray chamber and deposits moisture entrained contaminant particles on the baffles. The gas is then reduced in temperature, if above its vaporization point, in the heat exchanger with attendant condensation of vapors and further particle deposition. Finally, the gas is vectored upwardly in a spiralling counter-clockwise flow within the separator whereby its heavier constituents are collected in the outer compartments of the separator and its lighter constituents in the inner compartments thereof.

16 Claims, 7 Drawing Figures

PATENTED DEC 4 1973

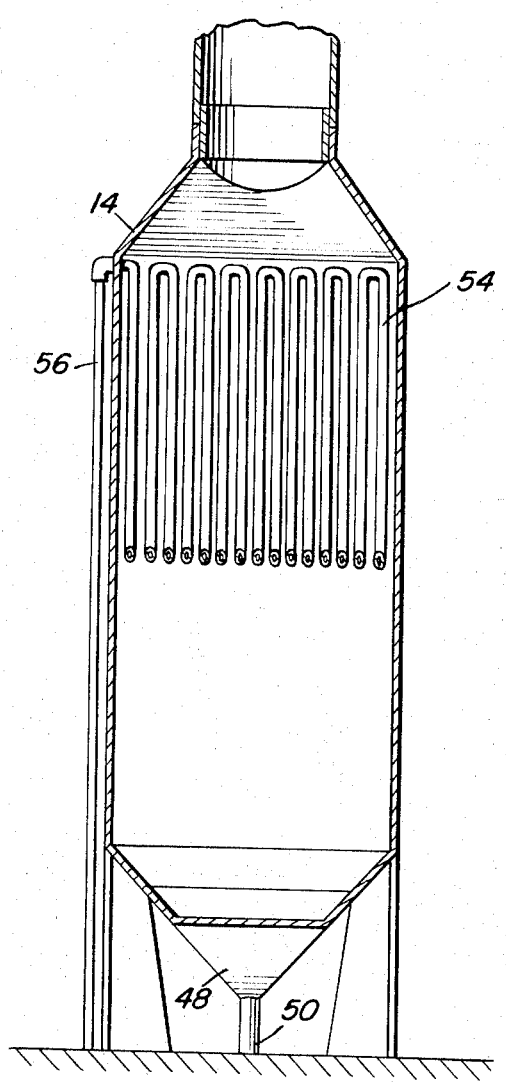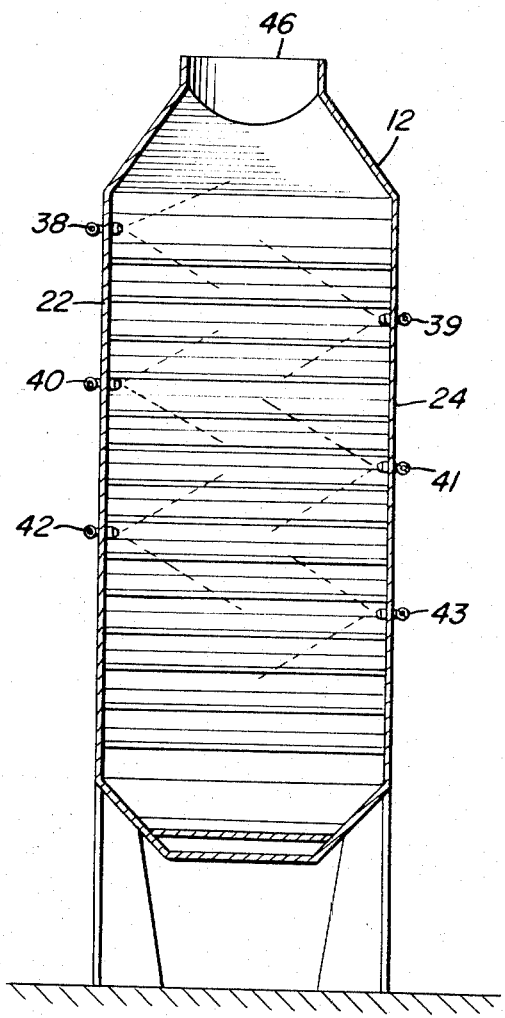

DEVICE FOR CLEANING EXHAUST PRODUCTS

The present invention relates to apparatus for cleaning industrial exhaust products, and more particularly to an apparatus for throughly removing both vapor and particulate contaminants from a gaseous exhaust medium exiting from either a combusion or non-combustion process.

Public concern for the protection of the environment, and particularly for the purity of the air, has resulted in the imposition of stringent limitations on the quantity and type of solid and vapor contaminants which may be released to the atmosphere. In order for industry to comply with these limitations it has become necessary for it to develop apparatus capable of effectively and economically removing these contaminants from its exhaust products. As the stringency of the air quality requirements has increased, the effectiveness and efficiency of the available apparatus has been pushed to its limit, and it has now become necessary to develop still more effective apparatus. As a result, much of the apparatus which has been developed has been designed with a specific industry or use in mind, and has not been generally adaptable. Indeed, much of the effort has been directed at developing apparatus for the removal of solid contaminants from hot combustion gases. Still other apparatus has been designed primarily to recover, utilize and conserve water from steam generation processes. There remains a need, however, for generally applicable apparatus, equally well suited to remove solid or vapor contaminants, and equally capable of accepting heated or unheated exhaust media.

It is therefore an object of the present invention to provide an apparatus capable of removing both solid and condensable vapor contaminants from industrial exhaust products.

It is another object of this invention to provide an apparatus equally capable of accepting a heated or unheated exhaust stream.

It is still another object of this invention to provide an apparatus which will thoroughly clean a gaseous industrial exhaust stream so that the final emission to the atmosphere will have no harmful effect on the environment.

Other objects and advantages of the present invention will become apparent from the following description and appended claims.

Briefly stated, in accordance with the aforestated objects, the present invention provides an apparatus for cleaning industrial exhaust gases comprising a first chamber adapted for gaseous flow therethrough having an inlet portion for receiving the exhaust gases and an outlet portion for directing the gases therefrom, spray means disposed at a plurality of points between the portions for directing a water spray into the gas flow, a plurality of baffle plates between the portions whereby turbulent flow occurs over the baffle plates and moisture entrained contaminant particles deposit thereon, and means for collecting the moisture entrained contaminant particles; and, a second chamber including an inlet for receiving gas flow from the first chamber, first, second and third concentric compartments in the second chamber, the second compartment communicating with the inlet, baffle means within the second compartment to impart a spiralling flow to gas therein whereby the spiralling flow forces the heavier components of the gas toward the outer compartment wall and the lighter components of the gas toward the inner compartment wall, collecting means associated with the walls of the second compartment whereby the heavier components of the gas are directed into the first compartment and the lighter components of the gas are directed into the third compartment, and disposal means communicating with the first and third compartments.

When the gas is above the vaporization point of water, heat exchange means are disposed between the first and second chambers to reduce the gas to the dew point.

The invention will be better understood from the following description taken in conjunction with the accompanying drawings.

FIG. 4 is a sectional view taken substantially along line 4—4 in FIG. 1.

FIG. 5 is a sectional view taken substantially along the line 5—5 in FIG. 1.

Figure 1:
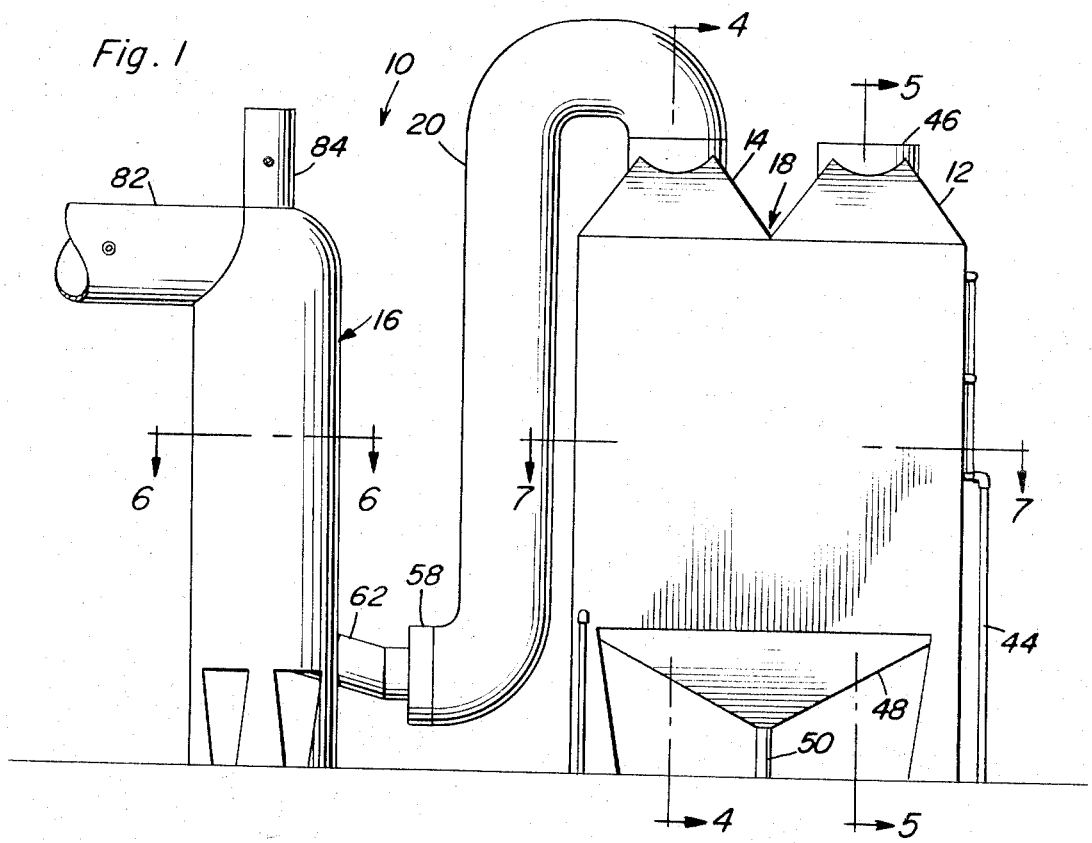
FIG. 1 is a front elevation view of the apparatus of the present invention.
Figure 2:
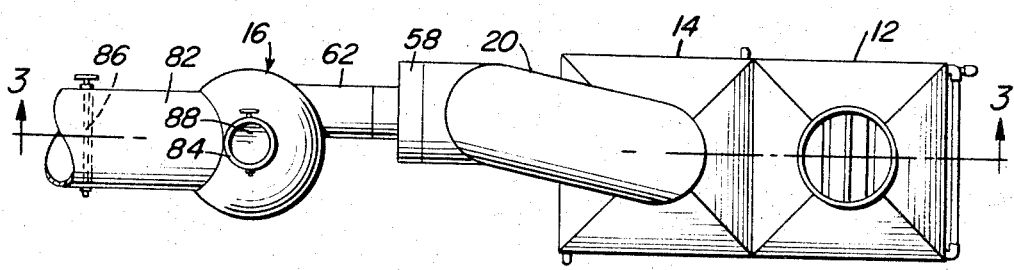
FIG. 2 is a plan view of the apparatus illustrated in FIG. 1.
Figure 6:
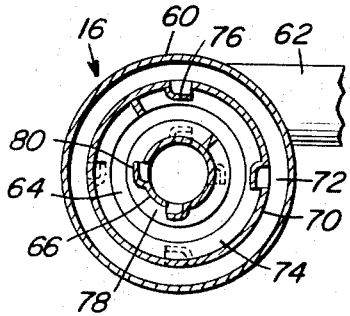
FIG. 6 is a sectional view taken substantially along the line 6—in FIG. 1.

Referring now to the drawings, there is shown generally at 10 an apparatus for the thorough cleaning of industrial exhaust products. The apparatus 10 includes generally a spray chamber 12, a heat exchanger 14 and a separator 16. Spray chamber 12 and heat exchanger 14 are preferably housed within a single enclosure 18, and separator 16 is spaced apart therefrom by external ducting 20.

Figure 7:
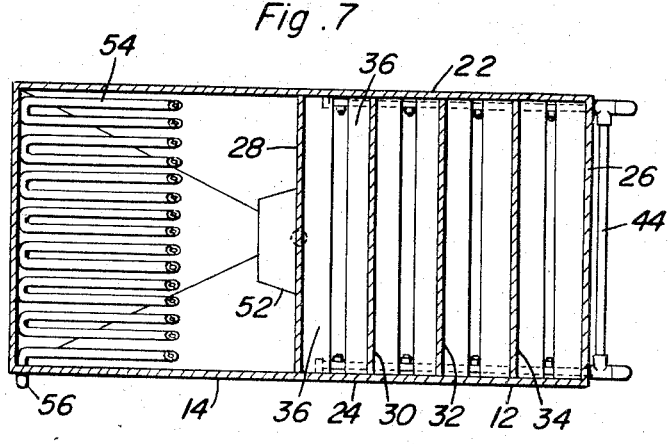
FIG. 7 is a sectional view taken substantially along the line 7—7 in FIG. 1.
Figure 3:
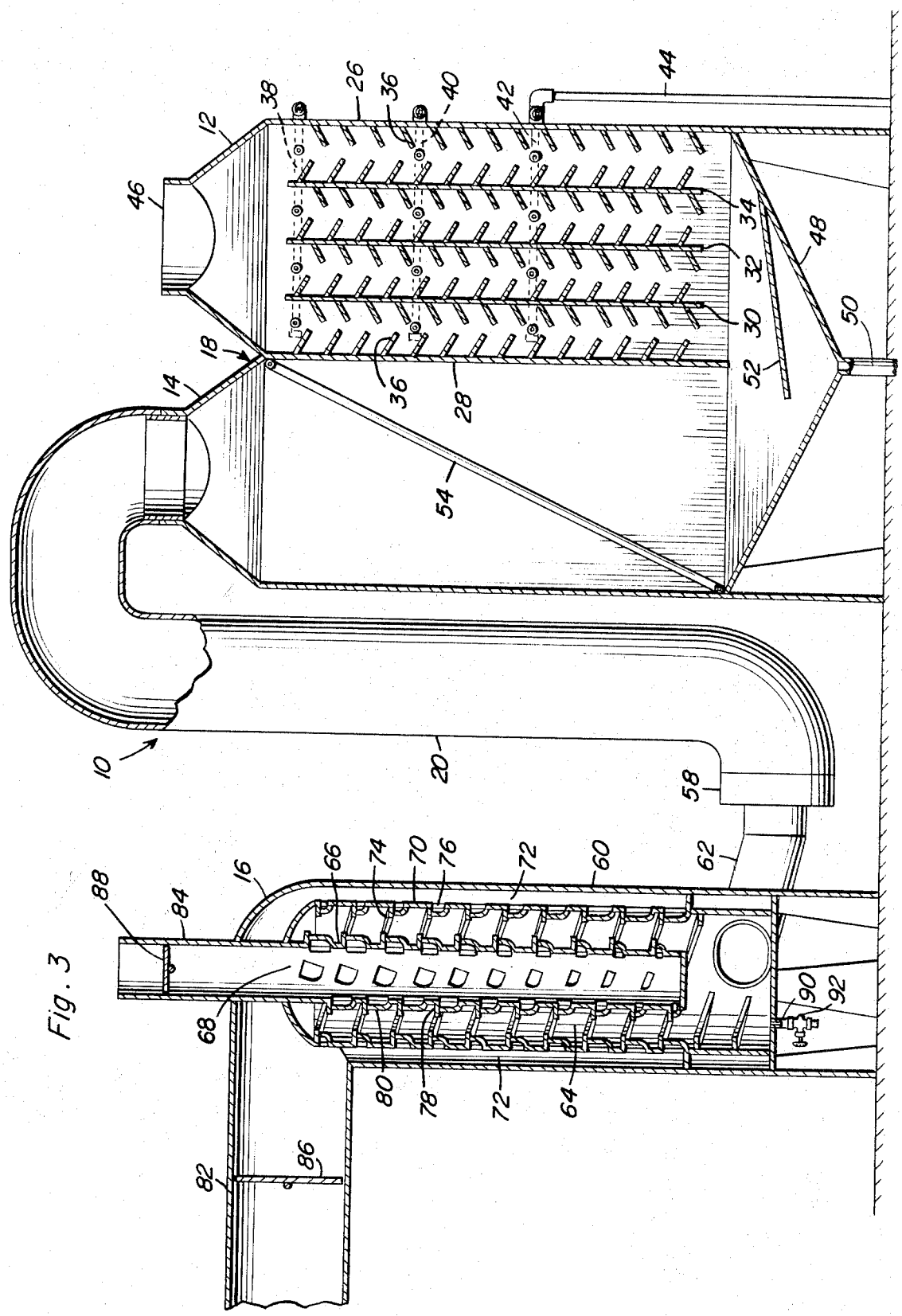
FIG. 3 is a sectional view taken substantially along the line 3—3 of FIG. 2.

Spray chamber 12 is a generally retangular structure consisting of side walls 22 and 24 joining end walls 26 and 28. End wall 28 also serves to separate spray chamber 12 from heat exchanger 14. Interior walls 30, 32 and 34 extend between side walls 22 and 24 and are generally parallel to end walls 26 and 28, dividing chamber 12 into a number of longitudinally extending generally rectangular compartments. As can be most clearly seen in FIG. 7, the generally rectangular compartments are defined on their long sides either by an end wall and an interior wall or by two interior walls, and on their short sides by side walls 22 and 24.

Generally parallel, vertically spaced apart baffle plates 36 are mounted on the long walls of each such compartment. Baffle plates 36 on one wall of a compartment are preferably vertically offset about one-half the vertical distance between plates from the baffle plates on the opposite wall of the same compartment. In addition, baffle plates 36 are inclined downward from the horizontal to form an acute angle between the underside of each plate and the wall on which it is mounted.

Spray bar 38, including a series of spray nozzles projecting through side wall 22, is horizontally mounted externally on side wall 22 near the upper inlet end of chamber 12. In like manner, spray bars 40 and 42 are mounted externally below and vertically spaced apart from spray bar 38. A similar arrangement is provided on the opposite side of chamber 12 in which spray bars 39, 41 and 43 are mounted externally on side wall 24. As can be seen most clearly in FIG. 5, spray bars 39, 41 and 43 may be vertically offset about one-half the vertical spacing between spray bars, with respect to spray bars 38, 40 and 42. Water is supplied to spray bars 38, 39, 40, 41, 42 and 43 by piping means 44 external of chamber 12.

Industrial exhaust gases enter chamber 12 at top inlet 46 and pass vertically downward through the fine water sprays created by the nozzles of multi-level spray bars 38, 40, 41, 42 and 43. It is noteworthy that the spray pattern created by these nozzles is overlapping and generally perpendicular to the direction of flow through chamber 12 to insure that all particles in the exhaust stream are thoroughly wetted before leaving the chamber. The water-wet gas, now containing water-entrapped contaminant particles, is directed over baffle plates 36, which impart a turbulent flow to the gas. Thus, the initial laminar flow of the gas is converted to eddys which tend to throw out the foreign particles. The water entrained heavy particles deposit as droplets onto baffle plates 36 and descend in rivulets to generally conical collection sump 48 which communicates with outlet 50 through which the particles are removed from chamber 12 to a settling tank or other suitable disposal means.

It will be appreciated that the spray pattern attainable from the series of nozzles mounted on each of spray bars 38–43 may be adjusted, as required, to throughly wet the contaminated particles in the incoming exhaust gas. In extremely foreign particle laden gas flows there may be as many as six spray patterns introduced into the gas flow. Should the incoming gas flow include a contaminant particle which is resistant to wetting with water, chemical treatment or injection of the spray water may be necessary to render that spray more effective in trapping such a particle.

As the exhaust medium leaves chamber 12 it is vectored into heat exchanger 14 by deflector plate 52. Heat exchanger 14 is only utilized when the temperature and pressure of the exhaust medium is such that it is above the vaporization point of water. In such a case, the exhaust medium containing steam formed by the vaporization of spray water in chamber 12, is passed across the outside of diagonally disposed cooling coil 54 of heat exchanger 14. Water, supplied through piping 56 external of exchanger 14, flows through coil 54 as the cooling medium. Cooling water temperature and flow rate is adjusted to reduce the temperature of the exhaust medium to the dew point. Generally, cooling in exchanger 14 serves (a) to condense vaporized moisture around contaminant particles in the gas flow and thereby remove the particles from the gas; (b) to remove excess water vaporized in chamber 12; and (c) to lower the temperature of the gas flow in preparation for cyclonic separation. Droplets of condensate, containing contaminant particles, are collected in sump 48, which serves both chamber 12 and heat exchanger 14, and removed through outlet 50 to a settling tank or other suitable disposal means. The remaining cooled exhaust gases leave exchanger 14 and enter ducting 20.

If the exhaust medium from chamber 12 is not above the vaporization point of water, then no cooling water flow occurs through coil 54 and the exhaust gases from chamber 12 flow unchanged through exchanger 14 and into ducting 20.

The exhaust gas is ducted, via ducting 20 into blower fan 58 where the velocity of the gas is increased prior to its entering separator 16. Separator 16 consists of generally cylindrical outer wall 60 enclosed at its top and bottom and having an inlet duct 62 communicating with the interior of the separator chamber at the lower end thereof and with longitudinally extending inner annular compartment 64 therein. A first longitudinally extending concentric cylindrical wall 66 defines a longitudinally extending centrally disposed cylindrical compartment 68 in separator 16. Concentric with walls 66 and 60 and spaced therebetween is a second longitudinally extending cylindrical wall 70 which, together with wall 66, defines inner annular compartment 64, and together with outer wall 60 defines outer annular compartment 72. Access to central compartment 68 and outer annular compartment 72 is blocked at the end nearest inlet duct 62 such that exhaust gas entering separator 16 through duct 62 can only flow upward through inner annular compartment 64.

Within inner annular compartment 64 are two sets of spiral baffles 74 and 78 mounted on opposite walls of the compartment to impart a spiralling, counter-clockwise direction to gas flowing upwardly therein. A first spiral baffle 74 extends from outer annular wall 70 into compartment 64. At 90° intervals along the underside of the spiral baffle, and extending from wall 70, are a series of generally J-shaped scoops 76 opening annularly into compartment 64 and communicating through an opening in wall 70 with outer annular compartment 72. The annular openings of scoops 76 into compartment 64 oppose the counter-clockwise direction of gas flow therethrough such that the spiralling gas along annular wall 70 tends to flow into the opening in scoop 76. A second spiral baffle 78 extends from inner annular wall 66 into compartment 64. It too has mounted beneath the underside thereof at wall 66 a series of 90° spaced, generally J-shaped scoops 80 opening annularly into compartment 64 in a direction opposite to the counter-clockwise direction of gas flow therethrough and communicating through an opening in wall 66 with central cylindrical compartment 68. The annular openings in the scoops 80 within compartment 64 are so directed that gas spiralling along wall 66 would tend to flow into the openings.

The openings in scoops 76 graduate in size from the bottom to the top of compartment 64, with the openings being larger at the bottom and smaller at the top. This configuration accommodates and encourages the rapid separation of the heavy particle laden entering gases from the lighter, cleaner gases. As the gases spiral upward in compartment 64 and the centrifugal separation between lighter and heavier gas components becomes more pronounced, an increased volume of lighter gases must be accommodated. Therefore the openings in scoops 80 graduate from small at the bottom of compartment 64 to large at the top.

The accelerated exhaust gases from blower 58 flow into separator 16 through inlet duct 62 which is inclined upwardly to impart a generally upward direction to the gases. Within separator 16, flow is channeled into spirally baffled inner annular compartment 64. The gases flow upward in a spiralling counter-clockwise fashion generally the path defined by baffles 74 and 78. As the gaes spiral upward, centrifugal forces cause the heavier constituents to move away from the center of rotation and to follow the contours of outer annular wall 70 and baffle 74. Scoops 76 collect these heavier constituents and direct them into outer annular compartment 72. The lighter, generally cleaner, constituents of the exhaust gases travel along inner annular wall 66 and baffle 78 in compartment 64 and are directed via scoops 80 to central compartment 68.

Gases collected in outer annular compartment 72 contain the heavier portions of the contaminants and may be directed through ducting 82 to the intake or starting point of the original industrial process, or, alternatively to suitable collection and disposal means. In processes involving some form of combustion, any unburned fuel and non-combustible particles will be collected in outer annular compartment 72 and may be recycled to the burner.

Gases collected in inner compartment 68 are generally clean, but may contain toxic components depending upon the industrial process. These gases are vented from compartment 68 via ducting 84 and may either be vented to the atmosphere directly or transferred to supplementary processes where the toxic components will be removed prior to release to the atmosphere.

Dampers 86 and 88 are provided in ducting 82 and 84, respectively, to allow control, if desired, of the quantity of gas flowing into outer annular compartment 72 and central compartment 68. In normal operation with dampers 86 and 88 fully open, the gas separation accomplished in separator 16 is dependent solely upon centrifugal forces. However, where, for example, it may be desirable to recycle additional gas to a burner, damper 88 may be fully or partially closed thereby encouraging the gas in separator 16 to flow through scoops 76 and into outer compartment 72. On the other hand, full or partial closure of damper 86, with damper 88 open, would encourage gas flow through scoops 80 into central compartment 68.

Any accumulation of liquids in separator 16 may be removed via outlet piping 90 and valve 92 to a settling tank or other suitable disposal means.

While the present invention has been described with reference to particular embodiments thereof, it will be understood that numerous modifications may be made by those skilled in the art without actually departing from the scope of the invention. Accordingly, all suitable modifications and equivalents may be resorted to which fall within the scope of the invention as claimed.

What is claimed as new is as follows:

1. Apparatus for cleaning industrial exhaust gases comprising:
   a first chamber adapted for gasous flow therethrough having an inlet portion for receiving the exhaust gases and an outlet portion for directing said gases therefrom,
   spray means disposed at a plurality of points between said portions for directing a water spray into the gas flow,
   a plurality of baffle plates between said portions oriented transverse to the direction of gas flow, whereby turbulent flow occurs over said baffle plates and moisture entrained contaminant particles deposit thereon, and
   means for collecting said moisture entrained contaminant particles; and,
   a second chamber including an inlet for receiving gas flow from said first chamber,
   a longitudinally extending central compartment therein and first and second longitudinally extending annular compartments concentric therewith, said first annular compartment communicating at one end with said inlet,
   first and second longitudinally extending spiral baffles projecting into said first annular compartment from the inner and outer annular walls thereof, respectively, whereby gaseous flow from said inlet spirals through said first annular compartment forcing the heavier components of the gas toward the outer annular wall and the lighter components of the gas toward the inner annular wall,
   outer collecting means in said first annular compartment associated with said outer annular wall and communicating with said second annular compartment to direct the heavier components of the gas into said second annular compartment, said outer collecting means comprising a plurality of spaced apart scoops disposed between adjacent turns of said second spiral baffle, said scoops opening into said first annular compartment in a direction opposite the spiral flow of gas therein and communicating through an opening in the outer annular wall of said first annular compartment with said second annular compartment,
   inner collecting means in said first annular compartment associated with said inner annular wall and communicating with said central compartment to direct the lighter components of the gas into said central compartment said inner collecting means comprising a plurality of spaced apart scoops disposed between adjacent turns of said first spiral baffle, said scoops opening into said first annular compartment in a direction opposite the spiral flow of gas therein and communicating through an opening in the inner annular wall of said first annular compartment with said central compartment, and
   disposal means communicating with said central and aecond annular compartments.

2. Apparatus, as claimed in claim 1, including heat exchange means disposed between said first and second chambers for removing heat from exhaust gases which are above the vaporization point of water.

3. Apparatus, as claimed in claim 2, wherein said heat exchange means comprises a cooling coil over which the exhaust gases are caused to pass and through which water flows as the cooling medium.

4. Apparatus, as claimed in claim 1, wherein said spray means comprises a plurality of vertically spaced apart spray bars, each of said spray bars including a plurality of spray nozzles thereon.

5. Apparatus, as claimed in claim 1, wherein said first chamber includes a pair of side walls joined by end walls, a plurality of longitudinally extending interior walls mounted between said side walls whereby adjacent interior and end walls define longitudinally extending compartments therebetween, and said plurality of baffle plates are substantially parallel and vertically spaced and extend into each said compartment from the walls thereof.

6. Apparatus, as claimed in claim 5, wherein the baffle plates extending from a wall of each compartment are vertically offset with respect to the baffle plates extending from the opposite wall of the same compartment.

7. Apparatus, as claimed in claim 6, wherein the underside of each baffle plate forms an acute angle with the wall on which it is mounted.

8. Apparatus, as claimed in claim 1, including accelerating means to increase the velocity of gases entering said second chamber.

9. Apparatus, as claimed in claim 8, wherein said accelerating means comprises a blower fan in the inlet to said second chamber.

10. Apparatus, as claimed in claim 1, wherein said scoops are disposed along the underside of said spiral baffle and spaced at intervals of 90° therealong.

11. Apparatus, as claimed in claim 1, wherein said scoops are disposed along the underside of said spiral baffle and spaced at intervals of 90° therealong.

12. Apparatus, as claimed in claim 1, including damper means for controlling the flow of gases into said central compartment and said outer annular compartment.

13. Apparatus for cleaning industrial exhaust gases comprising:
- a first chamber, including a pair of side walls joined by end walls, adapted for gaseous flow longitudinally there-through, having an inlet portion closing the top thereof for receiving the exhaust gases and an outlet portion at the bottom thereof for directing said gases therefrom,
- a plurality of longitudinally extending interior walls mounted between said side walls and generally parallel with said end walls whereby adjacent interior and ends walls define longitudinally extending rectangular compartments therebetween,
- a plurality of substantially parallel, vertically spaced baffle plates extending into each said compartment from the walls thereof, the baffle plates extending from a wall of each compartment being vertically offset with respect to the baffle plates extending from the opposite wall of the same compartment, and the underside of each baffle plate forming an acute angle with the wall from which it extends,
- a plurality of spray bars vertically spaced apart on said side walls, each of said spray bars including a plurality of spray nozzles, and
- means for collecting moisture entrained contaminant particles which deposit on said baffle plates; and
- a second chamber including an inlet for receiving gas flow from said first chamber, said inlet including a blower fan therein to increase the velocity of the gases entering said second chamber,
- a longitudinally extending central compartment therein and first and second longitudinally extending annular compartments concentric therewith, said first annular compartment communicating at its lower end with said inlet,
- first and second longitudinally extending spiral baffles projecting into said first annular compartment from the inner and outer annular walls thereof, respectively, whereby gaseous flow from said inlet spirals upwardly through said first annular compartment forcing the heavier components of the gas towards the outer annular wall and the lighter components of the gas towards the inner annular wall,
- a plurality of outer scoops disposed along the underside of said second spiral baffle and spaced at intervals of 90° therealong, said scoops opening into said first annular compartment in a direction opposite to the spiral flow of gas therein and communicating through an opening in the outer annular wall of said first annular compartment with said second annular compartment,
- a plurality of inner scoops disposed along the underside of said first spiral baffle and spaced at intervals of 90° therelong, said scoops opening into said first annular compartment in a direction opposite to the spiral flow of gas therein and communicating through an opening in the inner annular wall of said first annular compartment with said central compartment; and
- disposal means communicating with said central and second annular compartments.

14. Apparatus, as claimed in claim 13, including heat exchange means disposed between said first and second chambers, said heat exchange means comprising a cooling coil over which the exhaust gases are caused to pass and through which water flows as the cooling medium.

15. Apparatus, as claimed in claim 13, including dampers disposed in the outlet portions of said central compartment and said outer annular compartment for controlling the flow of gases into the respective compartments.

16. Apparatus, as claimed in claim 13, wherein said disposal means communicating with said second annular compartment comprises means for directing gases collected in said second annular compartment to the starting point of the industrial process which generated the exhaust gases.

* * * * *